(12) United States Patent
Cegnar et al.

(10) Patent No.: US 8,269,469 B2
(45) Date of Patent: Sep. 18, 2012

(54) EQUALIZING METHOD AND CIRCUIT FOR ULTRACAPACITORS

(75) Inventors: Erik Cegnar, Moscow, ID (US); Fred Jessup, Moscow, ID (US); Mike Maughan, Moscow, ID (US); David G. Alexander, Moscow, ID (US)

(73) Assignee: Ivus Industries, LLC, Moscow, ID (US)

( * ) Notice: Subject to any disclaimer, the term of this patent is extended or adjusted under 35 U.S.C. 154(b) by 515 days.

(21) Appl. No.: 12/540,281

(22) Filed: Aug. 12, 2009

(65) Prior Publication Data

US 2010/0039072 A1    Feb. 18, 2010

Related U.S. Application Data

(60) Provisional application No. 61/088,213, filed on Aug. 12, 2008.

(51) Int. Cl.
*H02J 7/00* (2006.01)
(52) U.S. Cl. ....................................................... 320/167
(58) Field of Classification Search .................. 320/167
See application file for complete search history.

(56) References Cited

U.S. PATENT DOCUMENTS

| | | | |
|---|---|---|---|
| 5,222,012 A * | 6/1993 | Frankeny et al. | 361/156 |
| 5,952,815 A | 9/1999 | Rouillard et al. | |
| 5,969,505 A | 10/1999 | Okamura | |
| 6,714,391 B2 | 3/2004 | Wilk et al. | |
| 6,777,917 B2 | 8/2004 | Desprez et al. | |
| 6,806,686 B1 | 10/2004 | Thrap | |
| 6,841,971 B1 | 1/2005 | Spee et al. | |
| 6,844,704 B2 | 1/2005 | Wilk et al. | |
| 7,042,197 B2 | 5/2006 | Turner et al. | |
| 7,085,112 B2 | 8/2006 | Wilk et al. | |
| 7,193,390 B2 * | 3/2007 | Nagai et al. | 320/116 |
| 7,206,705 B2 | 4/2007 | Hein | |
| 7,218,489 B2 | 5/2007 | Wilk et al. | |
| 7,463,009 B2 * | 12/2008 | Chang et al. | 320/121 |
| 7,573,151 B2 * | 8/2009 | Acena et al. | 307/9.1 |
| 7,750,607 B2 * | 7/2010 | Nakajima et al. | 320/167 |
| 2002/0177018 A1 * | 11/2002 | Fuglevand | 429/22 |
| 2003/0214267 A1 | 11/2003 | Long | |
| 2006/0176028 A1 * | 8/2006 | Schulte et al. | 320/166 |
| 2006/0194102 A1 | 8/2006 | Keshishian et al. | |
| 2006/0262467 A1 | 11/2006 | Wilk et al. | |
| 2007/0002518 A1 | 1/2007 | Wilk et al. | |
| 2008/0106239 A1 | 5/2008 | Cegnar | |
| 2008/0157721 A1 * | 7/2008 | Kaneko et al. | 320/136 |
| 2008/0169791 A1 * | 7/2008 | Daio | 320/166 |
| 2008/0211459 A1 * | 9/2008 | Choi | 320/134 |
| 2008/0303484 A1 * | 12/2008 | Lee et al. | 320/134 |
| 2010/0019732 A1 * | 1/2010 | Utsumi et al. | 320/136 |

FOREIGN PATENT DOCUMENTS

EP          0564149 A2    6/1993

* cited by examiner

*Primary Examiner* — Arun Williams
(74) *Attorney, Agent, or Firm* — Buchanan Nipper

(57) ABSTRACT

An equalizing method for ultracapacitor cell packs and/or series connected ultracapacitors.

20 Claims, 6 Drawing Sheets

EQUALIZING METHOD AND CIRCUIT FOR ULTRACAPACITORS

CROSS-REFERENCE TO RELATED APPLICATIONS

This application claims the priority date of the provisional application entitled Balancing Method for Ultracapacitor Cell Packs/Series Connected Ultracapacitors, filed by Erik Cegnar, Fred Jessup, Mike Maughan and David Alexander on Aug. 12, 2008, with application Ser. No. 61/088,213, the disclosure of which is incorporated herein by reference.

FIELD OF THE INVENTION

The invention generally relates to a method of equalizing ultracapacitor cell packs and/or series connected ultracapacitors.

BACKGROUND OF THE INVENTION

The capacitance and leakage rate of an ultracapacitor will vary from its rated value due to variation in the manufacturing process. Aging will also affect the capacitance and leakage of each individual cell. Because ultracapacitors are often charged and discharged as a series string and because the leakage and capacitance varies from cell to cell, the voltage of the individual ultracapacitors can vary from cell to cell. This cell voltage variation is disadvantageous because more energy will be stored in a series string when each cell is charged to its maximum operational voltage. Additionally, series connected cells are more likely to be overcharged which will prematurely age and rapidly degrade cells. The energy stored in an ideal capacitor is characterized by the following equation:

$$E = \frac{1}{2} \cdot CV^2$$

Typically, the prior art attempts to balance cells so that none of them become over charged. Overcharging would result in premature aging. Four prior art charging methods are common:

1. Distinct Voltage Drain Circuit—A circuit by which current is drained when the cell reaches a particular voltage. A circuit is connected over each cell.
2. Cell Compare and Drain—A circuit by which the voltages of two cells in a series string are compared and the cell and current is drained through a resistor and transistor from the cell with the higher voltage.
3. Resistive—A resistor is place over each cell. The resistor has a value that yields a current significantly higher than the leakage current of the cell. Because current is proportional to voltage, current from the cells with higher voltage is higher and therefore the cells tend toward having the same voltage.
4. Zener—This method is very similar to "Drain Circuit." A zener diode, which conducts at a particular voltage, is placed over each cell. Unlike the "Drain Circuit," zeners do not have a distinct conduction point and therefore begin conducting before the desired maximum cell voltage.

SUMMARY OF THE INVENTION

The preferred embodiment of the preset invention is an ultracapacitor charging apparatus and method for charging a series connected string of ultracapacitor cells having a plurality of balancing circuits. The method comprises the steps of: specifying a voltage balance hysteresis as variable V_BAL_HYST; charging the string of ultracapacitor cells; turning all balancing circuits off; measuring the voltage of each ultracapacitor cell to determine the smallest measured cell voltage; storing the smallest measured cell voltage as variable $V_{min}$; for each ultracapacitor cell in the series connected string iteratively performing the following steps: (a) measuring the voltage of the ultracapacitor cell to set Vcell; (b) computing the difference of Vcell and $V_{min}$; and (c) comparing difference of Vcell and $V_{min}$ to V_BAL_HYST, wherein if the difference of Vcell and $V_{min}$>V_BAL_HYST, then turning on the balancing circuit for the cell and draining current from the cell.

Still other features and advantages of the present invention will become readily apparent to those skilled in this art from the following detailed description describing preferred embodiments of the invention, simply by way of illustration of the best mode contemplated by carrying out the invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1A:
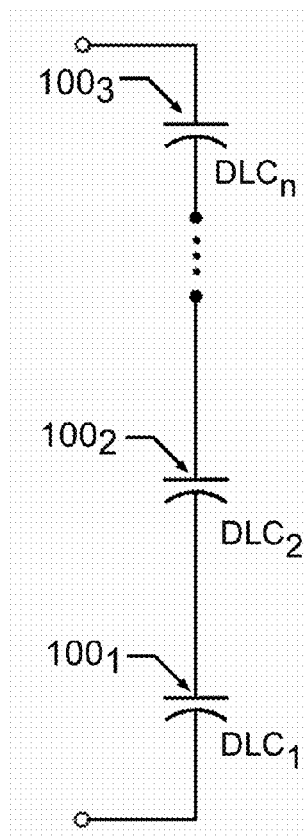
FIG. 1A shows a first ultracapacitor configuration.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Definitions. The term "ultracapacitor" refers to any capacitor exhibiting a very large capacitance, including but not limited to pseudocapacitors, supercapacitors, and double layer capacitors (DLC). The term "double layer capacitor" (DLC) refers to any device which exhibits capacitor-like characteristics and has a high capacitance. The term "balancing" ("equalizing") refers to the process by which the individual cell voltages of interconnected ultracapacitors are made to be approximately equal through the means of external circuitry. The term "balancing circuit" refers to one or more components that are used to drain current from one cell.

Figure 1B:
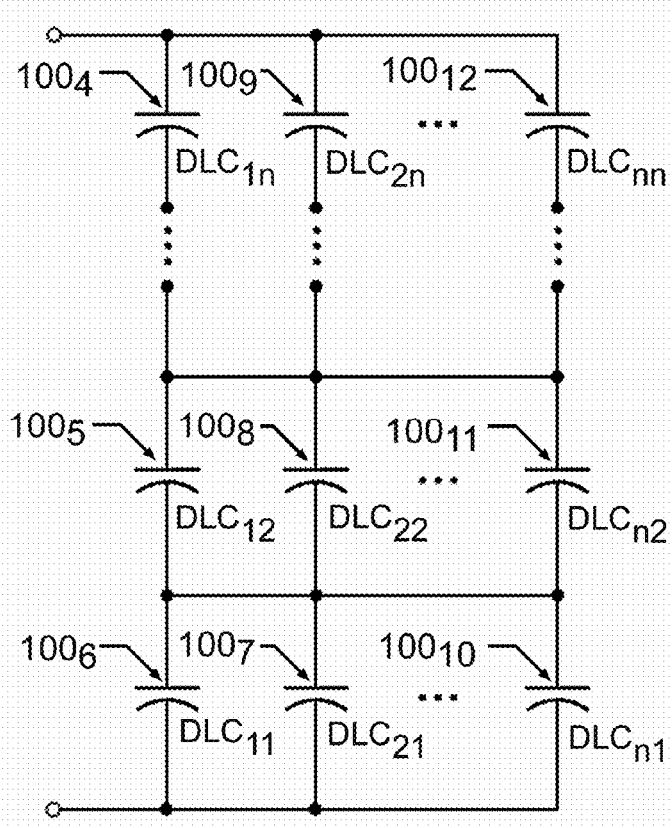
FIG. 1B shows a second ultracapacitor configuration.

The present invention is an apparatus/electrical circuit and methodology for balancing a series connected string of ultracapacitors. One representation of such a string of series connected ultracapacitors ($DLC_1$ (100$_1$), $DLC_2$ (100$_2$), $DLC_3$ (100$_3$)) is shown in FIG. 1A. In a second representation, each capacitor in the series connected string ($DLC_{1n}$ (100$_4$), $DLC_{12}$ (100$_5$), $DLC_{11}$ (100$_6$)) can have a multitude of capacitors ($DLC_{2n}$ (100$_9$), $DLC_{22}$ (100$_8$), $DLC_{21}$ (100$_7$), $DLC_{nn}$ (100$_{12}$), $DLC_{n2}$ (100$_{11}$), $DLC_{n1}$ (100$_{10}$)) in parallel with it, as shown in FIG. 1B. The preferred embodiment of the present invention maximizes the amount of energy that can be stored in a series connected string of ultracapacitors without charging beyond the cell voltage rating.

If ultracapacitor cells in a series connected string are charged to the largest voltage cell and all the cells are not equal in voltage, then the entire string stores less energy than possible. The maximum amount of energy is stored in series connected cells when all cell voltages are equal and charged to their maximum voltage. This balancing circuit and method causes all cells to be equal in voltage so that the maximum energy can be stored.

Figure 2:
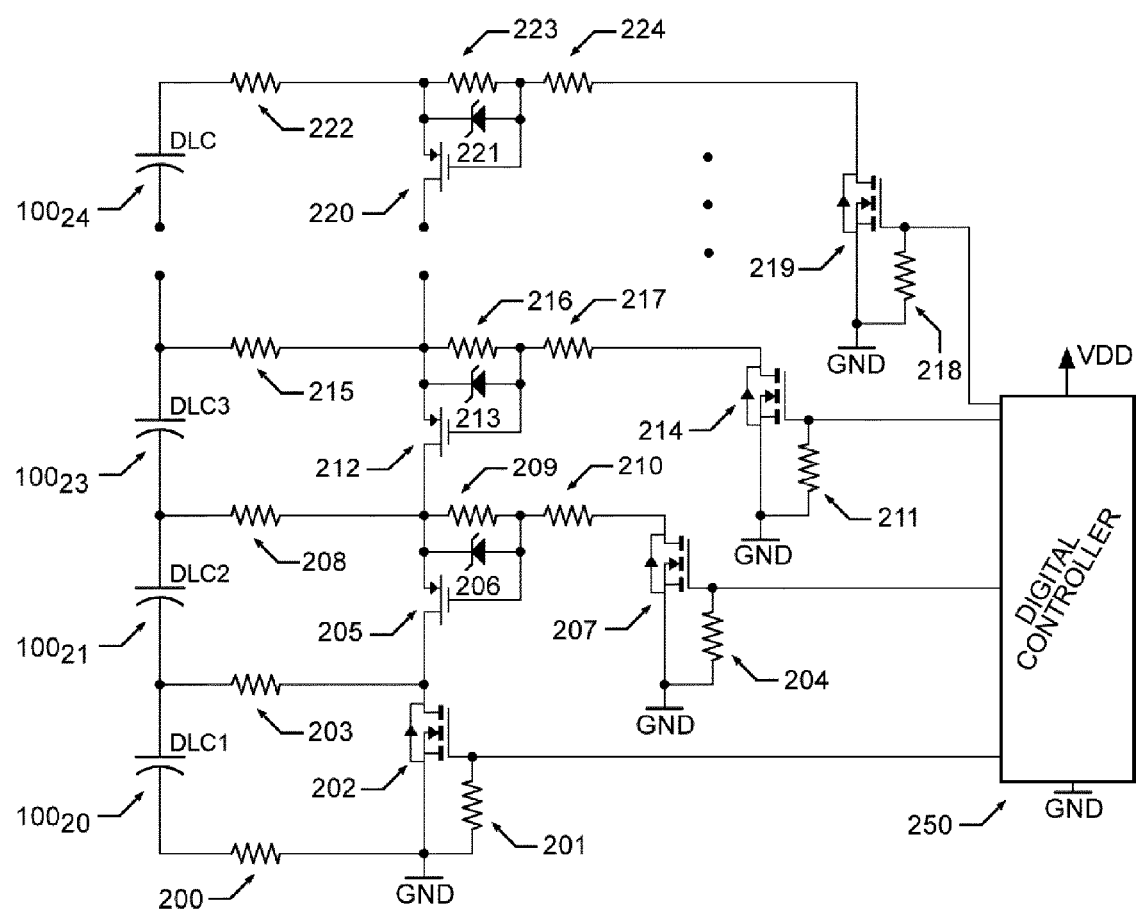
FIG. 2 shows a first balancing circuit schematic.

The balancing circuit shown in FIG. 2 allows current to be drained from each individual cell. This operation is controlled by ground referenced digital signals from a digital controller 250 with a separate control line providing an on/off signal for the balancing circuit of each cell. A signal of 0 indicated by zero volts reference to ground (GND) turns off a drain current from a corresponding cell and a signal of 1 indicated by a non-zero voltage higher than the gate threshold voltage of transistors 202, 207, 214, and 219 in FIG. 2 activates a circuit which causes a current to flow from a corresponding cell.

FIG. 2 shows an embodiment of a balancing circuit, which balances multiple cells. The circuit is not limited to any particular number of cells. The basic balancing circuit for one cell is formed by the circuit composed of resistors: 203, 204, 208, 209, 210; transistors: 205 and 207; and zener diode 206. The circuit works in the following way. When the signal at the gate of transistor 207 is equal to 0 volts, the gate source voltage (Vgs) is equal to 0 volts and therefore transistor 207 is not conducting current. Because there is no current flowing through transistor 207, no current flows through either resistors 209 or 210, and from ohms law (V=IR) then the voltage over resistors 209 and 210 is 0 volts. Because the voltage over resistor 209 is 0, the voltage from source to gate (Vgs) of the P-channel mosfet 205 is 0 volts. This causes mosfet 205 to be off and not conducting current. Therefore, no current is being drained from DLC2 (100$_{21}$) by mosfet 205.

When a signal voltage is applied to the gate of N-channel mosfet 207, the mosfet conducts current, which causes current to flow through resistors 209 and 210. Because resistance of 209 is much greater than the resistance of 210

Resistance 209>>Resistance 210 the voltage drop is much greater over resistor 209. This operation provides adequate voltage from source to gate of P-channel mosfet 206 to cause it to conduct current. In this embodiment, resistor 209 is one magnitude greater than resistor 210. As mosfet 206 is conducting, current flows from DLC2 (100$_{21}$) through resistors 208 and 203, and mosfet 205. This operation causes the voltage of DLC2 to decrease. This can be seen from the following equation which is the equation describing an ideal capacitor.

$$I_{DLC} = C\frac{dV}{dt}$$

The previously described operation allows the cells to be equalized by draining current from the cells with higher voltages.

The circuit composed of elements 200, 201, 202, and 203 is different than the above-described circuit. It balances the very first cell (the cell closest to ground) in a series connected string, which is $DLC_1$ (100$_{20}$) in FIG. 2. While the circuit could be the same as the previously described circuit, it is unnecessary and therefore in this embodiment it is simpler. It uses only the N-channel mosfet because the negative terminal is connected to ground, and therefore the voltage of the cell $DLC_1$ (100$_{20}$) is always in reference to ground. In order to cause a current to flow from $DLC_1$ (100$_{20}$) through resistor 203 and 200 and mosfet 202, a signal voltage is applied to the gate of mosfet 202. As with the previously described circuit, this causes the voltage of DLC to decrease as current is drained from it.

Resistors 200, 203, 208, 215, and 222 have a small resistance value, which is chosen to arrive at the desired balancing current. The desired balancing current is dependant on the particular applications and the size of cells used. In most applications, this resistance will be a value of less than 100Ω.

The resistors 201, 204, 211, and 218 are used to ensure the N-channel mosfets 202, 207, 214, and 219 are not conducting by pulling the gate-to-source voltages (Vgs) to zero when the circuit is not in operation.

The zener diodes 206, 213, and 221 in FIG. 2 exist to ensure that the source to gate voltage Vgs of the P-channel mosfets 205, 212, and 220 does not exceed the maximum voltage of the device. If a sufficient number of ultracapacitors are connected in a series string the maximum allowable voltage of Vsg could be exceeded. The maximum voltage from source to gate of a mosfet is typically 20V and is often closer to 10V for mosfets that are designed for low voltage operation. The zener diodes 206, 213, and 221 are sometimes designed as an integrated part of an OEM mosfet device. The diodes can either be separate external components or an integrated part of the mosfet.

FIG. 2 is shows a balancing circuit for four ultracapacitors connected in series. The circuit composed of resistors: 215, 218, 222, 223, and 224; transistor 220 and 219; and zener diode 211, represent a circuit which repeats with additional connected ultracapacitors. The circuit is not limited to any particular number of cells. Additionally, the transistors in this embodiment are mosfets, however other forms of transistors may be used (e.g., bi-polar junction transistors (BJTs), phototransistors, insulated gate bipolar transistors (IGBT), junction field effect transistors (JEFT)). Additional resistors 216, 217 and additional series connected strings DLC(100$_{24}$), $DLC_3$(100$_{23}$) are shown as well. The circuit of FIG. 2 allows for ground referenced digital (on/off) signals like what might come from a digital controller to drain current from individual cells in large series connected strings of ultracapacitors.

Figure 3:
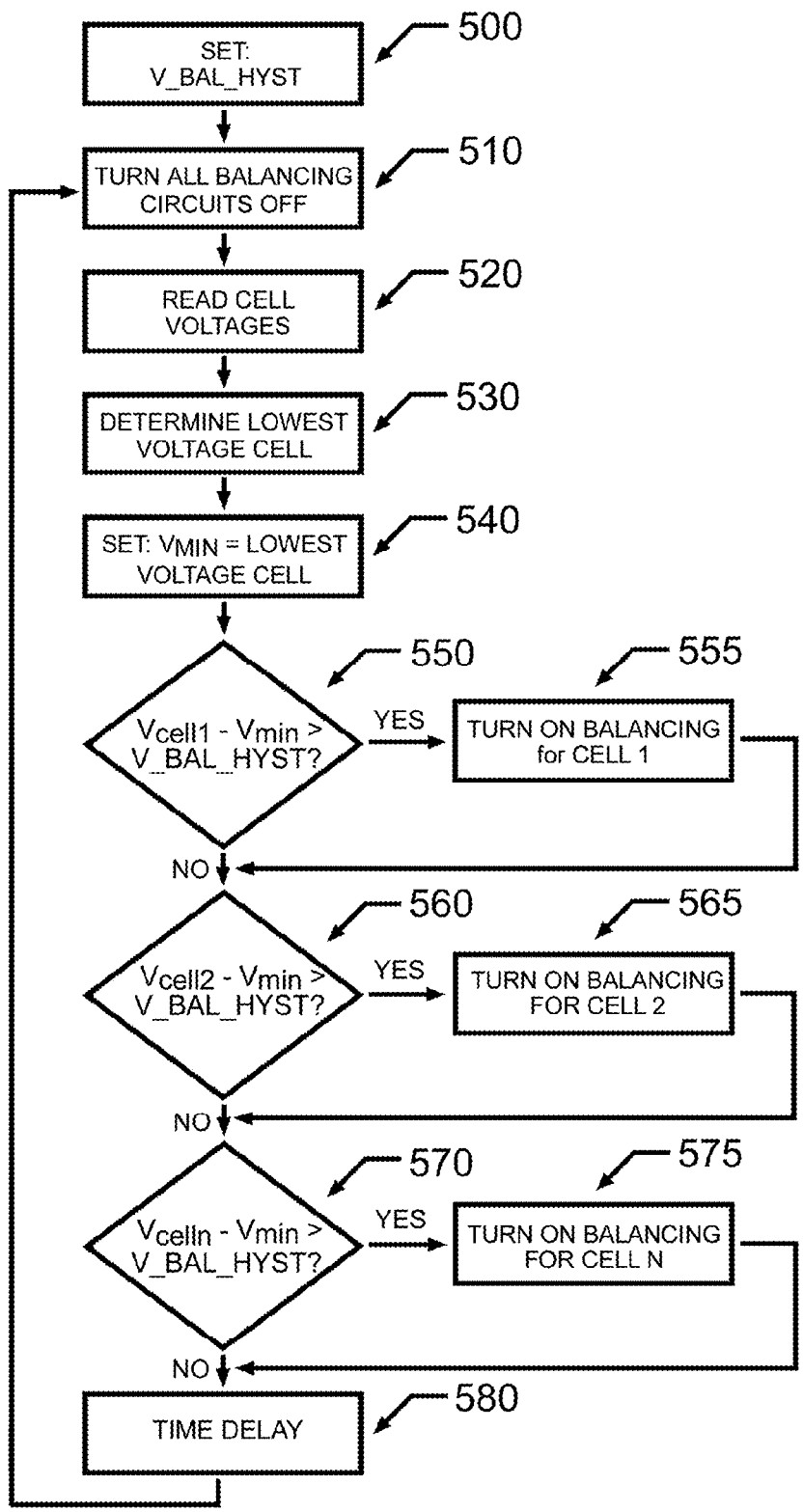
FIG. 3 shows a balancing method flow chart.

The previously described circuit (shown in FIG. 2) allows the voltages of the cells to be drained down so that they all have approximately the same voltage. The method illustrated in FIG. 3 describes by what process the balancing actually occurs in the preferred embodiment.

It is preferred that a separate analog circuit (not shown in FIG. 2) be connected to the terminals of each ultracapacitor in a series string. The circuit takes a differential voltage signal and converts it to a ground-referenced signal that can be read by a digital controller. The digital controller uses these voltages in the following method, which is shown in flow diagram form in FIG. 3.

The method drains a relatively small amount of current from every cell except for the lowest voltage cell. In this way, the voltages of the cells become very close to being all equal to each other or in other words balanced or equalized.

In step 500, the digital controller first specifies the variable "V_BAL_HYST," which stands for "voltage balance hysteresis." This value will indicate how closely the cells become balanced to each other. The use of this variable is advantageous because it is typically necessary to only balance cell voltages to some specific voltage. Attempting to balance cells to very small voltages is not useful and wastes energy. After "V_BAL_HYST" is set, the main process loop is entered. In step 510, all of the balancing circuits are turned off and therefore none of the balancing circuits are draining current from any of the cells. This is done because in some embodiments the draining current from the cells could affect the accurate measurement of the cell voltages. In step 520, the voltage of each cell is measured by means of said analog measurement circuit. In step 530, the smallest measured cell voltage in the series connected string is determined. In step 540, said smallest voltage is stored in a variable called "$V_{min}$." In step 550, the voltage of the first cell in the series string minus $V_{min}$ is compared to "V_BAL_HYST." If the result of the subtraction is greater than "V_BAL_HYST," in step 555 the balancing circuit for that cell is turned on where current is drained from the cell. If the result of the subtraction is not greater than "V_BAL_HYST," the circuit for the corresponding cell is not turned on and therefore remains in the off state where no current is drained from the cell. Such a step would be repeated for all cells in the series connected string, for instance the embodiment shown in FIG. 3, steps 560 and 565 for "cell2" and steps 570 and 575 for "celln." While this embodiment shows three particular cells (cell1, cell2, celln), the method is not limited to any specific number of series connected cells. In step 580, an artificial time delay is employed. This is used to make sure the cells have an adequate time to balance before the loop repeats and all balancing circuits are shut off. Because this loop is cyclical and because it requires a finite amount of time to execute the described process, the result is a square wave type of balancing signal of which the off and on time for each engaged balancing circuit will depend on the amount of time delay and the amount of processing time for each operation.

Figure 4:
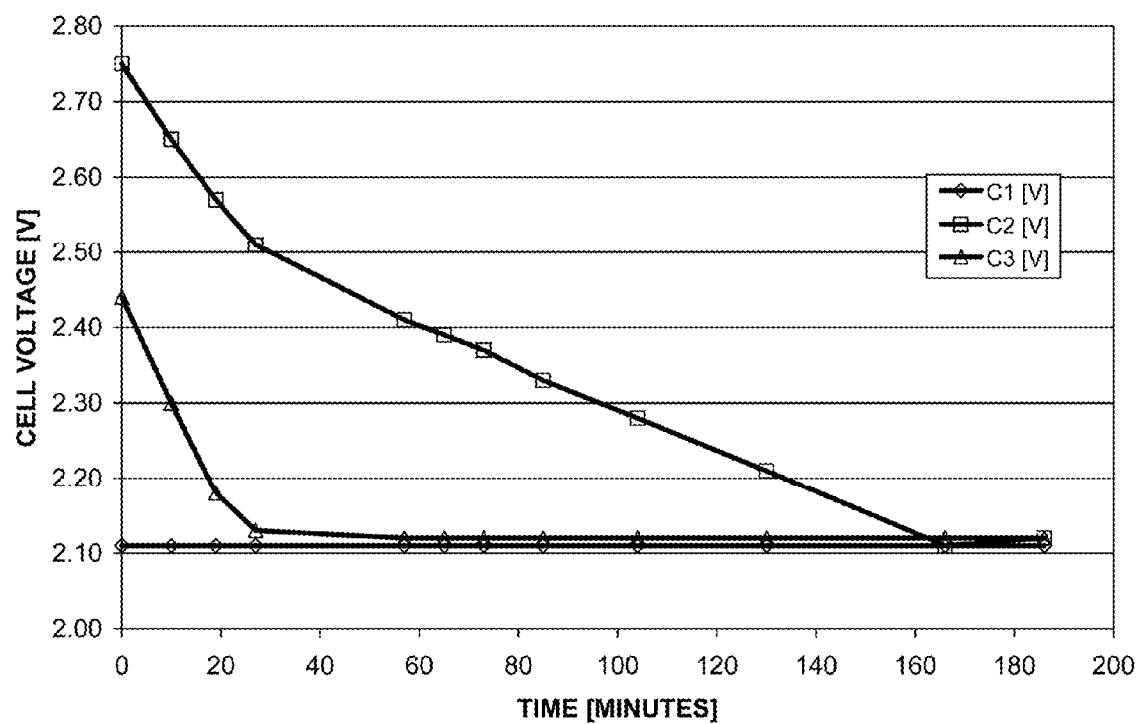
FIG. 4 is a chart showing three series-connected cells undergoing equalization.

FIG. 4 is a graph illustrating the cell voltage (V) of three series-connecting cells undergoing equalization over a period of time (minutes) via one embodiment of the present invention.

Figure 5:
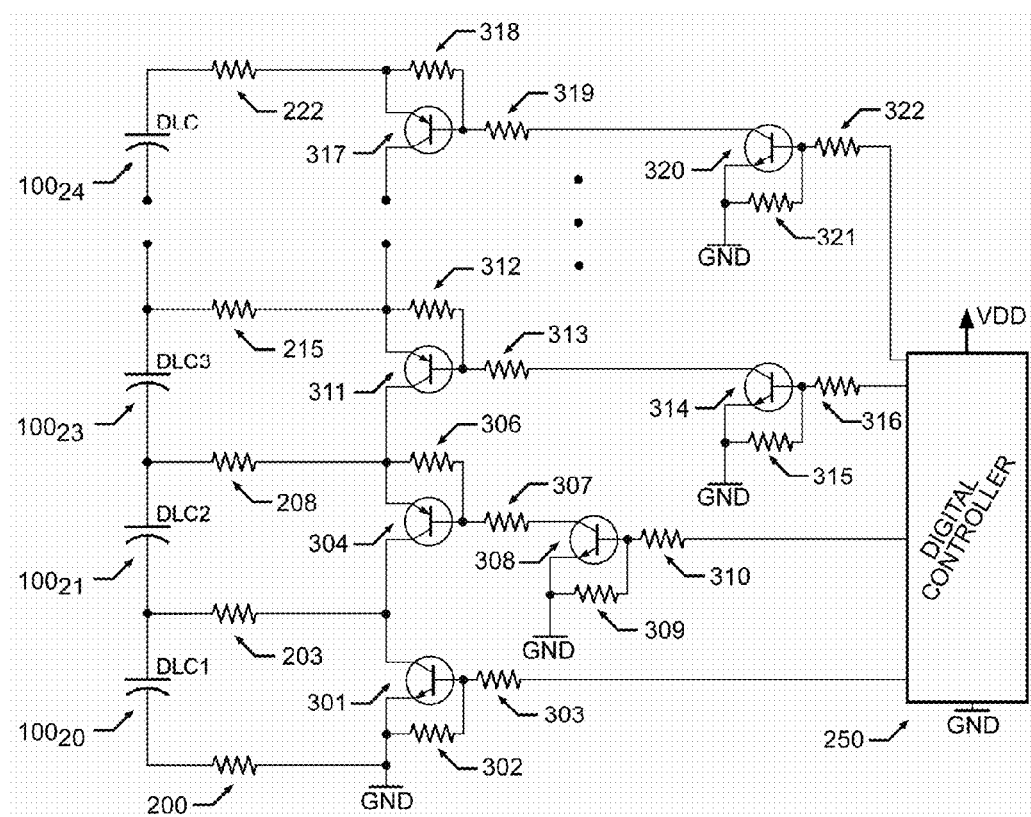
FIG. 5 shows a second balancing circuit schematic.

FIG. 5 shows a balancing circuit schematic embodiment using bipolar junction transistors (BJT) for four ultracapacitors connected in series. The circuit composed of elements 200, 301, 302, 303 and 203 balances the very first cell (the cell closest to ground) in a series connected string, which is $DLC_1$ ($100_{20}$). This circuit uses only one BJT because the negative terminal is connected to ground, and therefore the voltage of the cell $DLC_1$ ($100_{20}$) is always in reference to ground. In order to cause a current to flow from $DLC_1$ ($100_{20}$) through resistor 203 and 200 and BJT 301, a signal voltage is applied to the base of BJT 301. This causes the voltage of DLC to decrease as current is drained from it. Resistors 200, 203, 208, 215, and 222 have a small resistance value, which is chosen to arrive at the desired balancing current. The desired balancing current is dependant on the particular applications and the size of cells used. In most applications, this resistance will be a value of less than 100Ω. The resistors 302, 309, 315, and 321 are used to ensure the BJTs 301, 308, 314, and 320 (and likewise resistors 306, 312, and 318 for BJTs 304, 311, 317 respectively) are not conducting by pulling the base to emitter voltages (Vbe) to zero when the circuit is not in operation. The resistors 303, 310, 316 and 322 in FIG. 2 exist to limit the base current Ib of the BJTs 301, 308, 314 and 320 (and likewise resistors 307, 313, and 319 for BJTs 304, 311 317 respectively). The circuit composed of resistors: 215, 321, 322, 222, 318 and 319; transistor 317 and 320; represent a circuit which repeats with additional connected ultracapacitors. The circuit is not limited to any particular number of cells. Additional resistors 312, 313 and additional series connected strings $DLC(100_{24})$, $DLC_3(100_{23})$ are shown as well.

Figure 6:
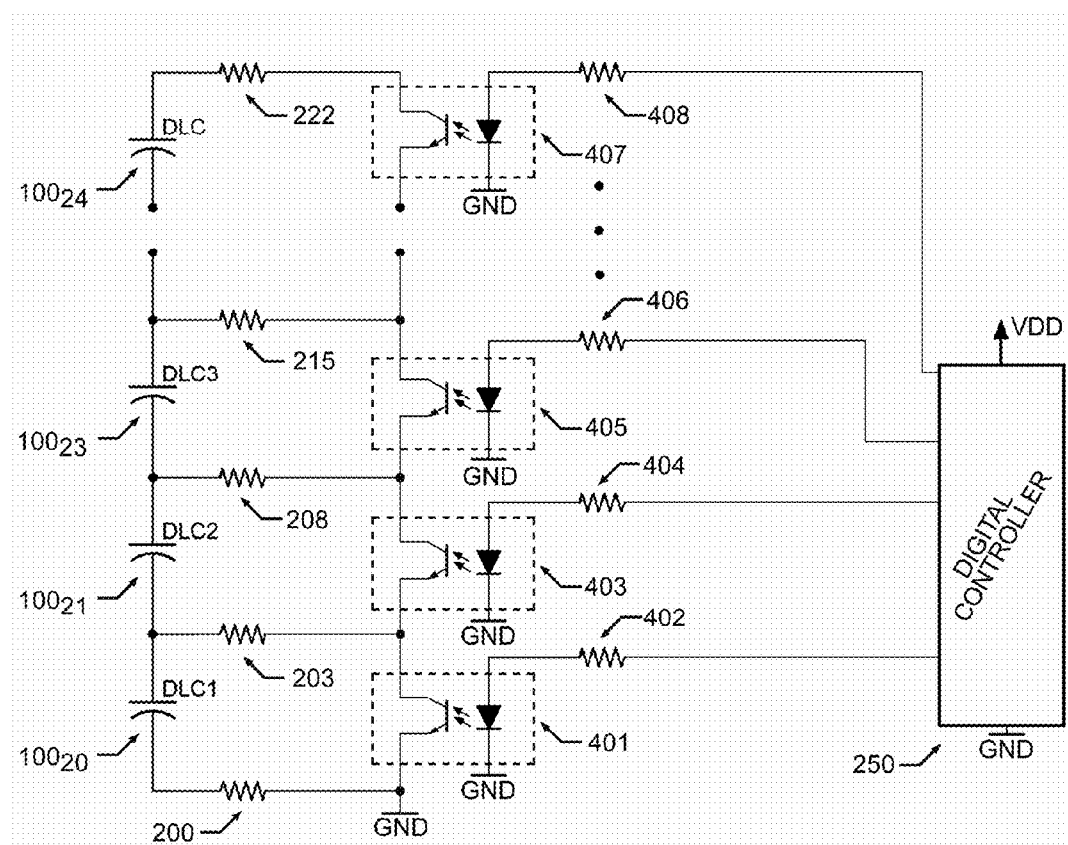
FIG. 6 shows a third balancing circuit schematic.

FIG. 6 shows a balancing circuit schematic embodiment using phototransistors (e.g., phototransistor optocoupler) for four ultracapacitors connected in series. The circuit composed of elements 200, 203, 401, and 402 balances the very first cell (the cell closest to ground) in a series connected string, which is $DLC_1$ ($100_{20}$). In order to cause a current to flow from $DLC_1$ ($100_{20}$) through resistor 203 and 200 and phototransistor 401, a signal voltage is applied to the input (anode) of phototransistor 401. This causes the voltage of DLC to decrease as current is drained from it. Resistors 200, 203, 208, 215, and 222 have a small resistance value, which is chosen to arrive at the desired balancing current. Resistors 402, 404, 406, 408 exist to limit current into the input of the phototransistor optocoupler, similar to how resistors are used in the BJT circuit (FIG. 5) to limit current. The desired balancing current is dependent on the particular applications and the size of cells used. In most applications, this resistance will be a value of less than 100Ω. The circuit composed of resistors: 215, 222, 408, and phototransistor 407, represent a circuit which repeats with additional connected ultracapacitors. The circuit is not limited to any particular number of cells. Additional series connected strings $DLC(100_{24})$, $DLC_3$ ($100_{23}$) are shown as well. The preferred phototransistor being general purpose 6-pin phototransistor optocouplers manufactured by Fairchild Semiconductor (e.g, model numbers 4N25, 4N26, 4N27, 4N28, 4N35, 4N36, 4N37, H11A1, H11A2, H11A3, H11A4, H11A5), Unlike the "Cell Compare and Drain" analog circuit of the prior art, which compares the voltage of two series connected cells, in the preferred embodiment of the present invention hysteresis is used so they are not unnecessarily consuming power when they are almost perfectly balanced. This circuit and method do not consume energy once the cells are balanced. This allows for intelligent balancing where all cells are balanced to the lowest cell as opposed to balancing circuits that only compare two cells next to each other. Resistors and zener diodes are always consuming power even when the cells are already balanced.

The "Distinct-Voltage-Drain Circuit" of the prior art only drains current when the cell is fully charged. The cells only become balanced when the string is at its maximum voltage for a time sufficient to drain the higher voltage cells. The present invention's circuit and method can balance cells at voltages less than the maximum voltage and therefore intelligently determines when it is and is not appropriate to balance.

With any of the described prior art circuits, the voltages of each individual cell are not known. It is assumed with these circuits that all cells are equal; however cells are rarely equal due to manufacturing variation and differences due to aging. As a result, individual cells can easily become over charged. In one embodiment, a digital controller measures each individual voltage and intelligently balances every cell voltage in a string.

While the use of mosfet transistors is disclosed, there exist other types of transistors that would work in the place of N-channel and P-channel mosfets. Possible substitution types include but are not limited to phototransistors, BJTs (bi-polar junction transistors) and IGBT (insulated gate bipolar transistors).

Example Embodiment. An ultracapacitor charging method for charging a series connected string of ultracapacitor cells having a plurality of balancing circuits, said method comprising the steps of: (a) specifying a voltage balance hysteresis as variable V_BAL_HYST; (b) charging said string of ultracapacitor cells; (c) turning all balancing circuits off; (d) measuring the voltage of each ultracapacitor cell to determine the smallest measured cell voltage; (e) storing said smallest measured cell voltage as variable $V_{min}$; and (f) for each ultracapacitor cell in the series connected string iteratively performing the following steps: (i) measuring the voltage of the ultracapacitor cell to set Vcell; (ii) computing the difference of Vcell and $V_{min}$; (iii) comparing difference of Vcell and $V_{min}$ to V_BAL_HYST, wherein if the difference of Vcell and $V_{min}$>V_BAL_HYST, then turning on the balancing circuit for the cell, draining current from the cell. Preferably, the step of measuring the voltage of each ultracapacitor cell to determine the smallest measured cell voltage is performed via an analog measurement circuit. Preferably, the step of charging said string of ultracapacitor cells is performed by a device which transfers charge in a controlled fashion (e.g., charger). Preferably, the step of specifying a voltage balance hysteresis as variable V_BAL_HYST is performed by a digital controller. Preferably, wherein after a predetermined period of time has passed, steps (c), (d), (e) and (f) are repeated.

Example Embodiment. An apparatus for charging a series connected string of ultracapacitor cells, said apparatus comprising: a charger for charging said string of ultracapacitor cells; a plurality of balancing circuits for draining current from the cell; and a digital controller, said digital controller specifying a voltage balance hysteresis as variable V_BAL_HYST, said digital controller turning all balancing circuits off, determining which cell has the smallest cell voltage ($V_{min}$), wherein as the ultracapacitor cells charge said digital controller monitors the voltage of each of the ultracapacitor cells, turning the corresponding balancing circuit on for any ultracapacitor cells where the difference between the voltage of the ultracapacitor cell and $V_{min}$>V_BAL_HYST. Preferably, an analog measurement circuit is utilized to measure the voltage of each ultracapacitor cell so that said digital controller can determine the smallest measured cell voltage. Preferably, an artificial time delay for providing said ultracapacitor cells with an adequate time to balance, wherein after said time delay said digital controller turning all balancing circuits off, determining which cell has the smallest cell voltage ($V_{min}$), wherein as the ultracapacitor cells charge said digital controller monitors the voltage of each of the ultracapacitor cells, turning the corresponding balancing circuit on for any ultracapacitor cells where the difference between the voltage of the ultracapacitor cell and $V_{min}$>V_BAL_HYST.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. An ultracapacitor charging method for charging a series connected string of ultracapacitor cells having a plurality of balancing circuits, said method comprising the steps of:
   a. specifying a voltage balance hysteresis as variable V_BAL_HYST;
   b. charging said string of ultracapacitor cells;
   c. turning all balancing circuits off;
   d. measuring the voltage of each ultracapacitor cell to determine the smallest measured cell voltage;
   e. storing said smallest measured cell voltage as variable $V_{min}$ in a digital controller; and
   f. for each ultracapacitor cell in the series connected string iteratively performing the following steps by said digital controller:
      i) measuring the voltage of the ultracapacitor cell to set Vcell;
      ii) computing the difference of Vcell and $V_{min}$;
      iii) comparing difference of Vcell and $V_{min}$ to V_BAL_HYST, wherein if the difference of Vcell and $V_{min}$>V_BAL_HYST, then turning on the balancing circuit for the cell, draining current from the cell.

2. The ultracapacitor charging method of claim 1, wherein the step of measuring the voltage of each ultracapacitor cell to determine the smallest measured cell voltage is performed via an analog measurement circuit.

3. The ultracapacitor charging method of claim 1, wherein the step of charging said string of ultracapacitor cells is performed by a charger.

4. The ultracapacitor charging method of claim 1, wherein the step of specifying a voltage balance hysteresis as variable V_BAL_HYST is performed by said digital controller.

5. The ultracapacitor charging method of claim 1, wherein after a predetermined period of time has passed, steps c, d, e and f are repeated.

6. An ultracapacitor charging method for charging a series connected string of ultracapacitor cells having a plurality of balancing circuits, said method comprising the steps of:
   a. specifying a voltage balance hysteresis as variable V_BAL_HYST;
   b. charging said string of ultracapacitor cells;
   c. establishing a predetermined time interval; and
   d. performing the following steps for a period of time equal to said time interval:
      turning all balancing circuits off;
      ii. measuring the voltage of each ultracapacitor cell to determine the smallest measured cell voltage;
      iii. storing said smallest measured cell voltage as variable $V_{min}$ in a digital controller;
      iv. for each ultracapacitor cell in the series connected string iteratively performing the following steps by said digital controller:
         a) measuring the voltage of the ultracapacitor cell to set Vcell;
         b) computing the difference of Vcell and $V_{min}$;
         c) comparing difference of Vcell and $V_{min}$ to V_BAL_HYST, wherein if the difference of Vcell and $V_{min}$>V_BAL_HYST, then turning on the balancing circuit for the cell, draining current from the cell; and
   e. repeating step d after said period of time has passed.

7. The ultracapacitor charging method of claim 6, wherein the step of measuring the voltage of each ultracapacitor cell to determine the smallest measured cell voltage is performed via an analog measurement circuit.

8. The ultracapacitor charging method of claim 6, wherein the step of charging said string of ultracapacitor cells is performed by a charger.

9. The ultracapacitor charging method of claim 6, wherein the step of specifying a voltage balance hysteresis as variable V_BAL_HYST is performed by said digital controller.

10. An apparatus for charging a series connected string of ultracapacitor cells, said apparatus comprising:
- a charger for charging said string of ultracapacitor cells;
- a plurality of balancing circuits for draining current from the cell; and
- a digital controller, said digital controller specifying a voltage balance hysteresis as variable V_BAL_HYST, said digital controller turning all balancing circuits off, determining which cell has the smallest cell voltage ($V_{min}$), wherein as the ultracapacitor cells charge said digital controller monitors the voltage of each of the ultracapacitor cells, turning the corresponding balancing circuit on for any ultracapacitor cells where the difference between the voltage of the ultracapacitor cell and $V_{min}$>V_BAL_HYST.

11. The apparatus of claim 10, wherein an analog measurement circuit is utilized to measure the voltage of each ultracapacitor cell so that said digital controller can determine the smallest measured cell voltage.

12. The apparatus of claim 10, further comprising an artificial time delay for providing said ultracapacitor cells with an adequate time to balance, wherein after said time delay said digital controller turning all balancing circuits off, determining which cell has the smallest cell voltage ($V_{min}$), wherein as the ultracapacitor cells charge said digital controller monitors the voltage of each of the ultracapacitor cells, turning the corresponding balancing circuit on for any ultracapacitor cells where the difference between the voltage of the ultracapacitor cell and $V_{min}$>V_BAL_HYST.

13. The apparatus of claim 10, wherein said plurality of balancing circuits comprises at least one first balancing circuit which allows current to be drained from each ultracapacitor cell in said string.

14. The apparatus of claim 11, wherein said at least one first balancing circuit comprises a plurality of resistors, at least one MOSFET, and at least one zener diode.

15. The apparatus of claim 11, wherein said at least one first balancing circuit comprises a plurality of resistors and at least one transistor.

16. The apparatus of claim 15, wherein said at least one transistor is at least one bi-polar junction transistor.

17. The apparatus of claim 15, wherein said at least one transistor is at least one phototransistor.

18. The apparatus of claim 15, wherein said at least one transistor is at least one insulated gate bipolar transistor.

19. The ultracapacitor charging method of claim 1, further comprising the step of establishing a predetermined time interval.

20. The ultracapacitor charging method of claim 19, wherein said steps c, d, e and f are performed for a period of time equal to said time interval, and wherein step d is repeated after said period of time has passed.

* * * * *